(12) United States Patent
McNeil (10) Patent No.: US 6,684,308 B2
(45) Date of Patent: Jan. 27, 2004

(54) METHOD AND SYSTEM FOR PROVIDING DIRECT ACCESS RECOVERY USING SEEKABLE TAPE DEVICE

(75) Inventor: Daniel D. McNeil, Tigard, OR (US)

(73) Assignee: Mirapoint, Inc., Sunnyvale, CA (US)

( * ) Notice: Subject to any disclaimer, the term of this patent is extended or adjusted under 35 U.S.C. 154(b) by 105 days.

(21) Appl. No.: 10/062,880

(22) Filed: Jan. 31, 2002

(65) Prior Publication Data

US 2003/0145180 A1 Jul. 31, 2003

(51) Int. Cl.[7] .............................................. G06F 12/16
(52) U.S. Cl. ........................................ 711/162; 707/204
(58) Field of Search ........................ 711/162; 707/204; 714/6

(56) References Cited

U.S. PATENT DOCUMENTS 5,778,395 A * 7/1998 Whiting et al. ............ 707/204
5,907,672 A * 5/1999 Matze et al. ................... 714/8
5,982,572 A * 11/1999 Dahlerud ................... 360/72.2
6,578,121 B1 * 6/2003 Schutzman ................. 711/162

* cited by examiner

*Primary Examiner*—Hiep T. Nguyen
(74) *Attorney, Agent, or Firm*—Bever, Hoffman & Harms, LLP; Jeanette S. Harms (57) ABSTRACT

A method for backing up data in a computer system from a plurality of primary data sources to a secondary data source is provided. The method comprises copying data sections from the plurality of primary data sources to the secondary data source and providing a data pointer on the secondary data source. The data pointer indicates a starting point of each transfer from the plurality of primary data sources and where that starting point is on the secondary data source. This data pointer information provides the minimum information necessary to map a location from the primary data source(s) to its location on the secondary data source.

15 Claims, 7 Drawing Sheets

METHOD AND SYSTEM FOR PROVIDING DIRECT ACCESS RECOVERY USING SEEKABLE TAPE DEVICE

BACKGROUND OF THE INVENTION

1. Field of the Invention

The present invention relates to a method and system for backing up data from a plurality of disks, and particularly to restoring the data for individual files and/or folders from a backup tape using minimal map information.

1. Related Art

Backing up data from one or more computer disks is typically performed to recover from inadvertent user deletions/overwrites or from disk hardware failure. In the case of inadvertent user deletions/overwrites, only the data corresponding to the destroyed data is copied to the original disk from the backup. In the case of disk hardware failure, the user can restore all files to the original disk from the most recent backup. In most computer systems, the backup device is a tape drive, which can accommodate large amounts of data at a relatively low cost per byte of storage.

Generally, conventional backup methods provide for either file-by-file backup or image backup. In a file-by-file backup, the backup program copies one file at a time from the disk to the tape. Specifically, the program places all pieces of data for each file, irrespective of actual locations on the disk, into a single sequential block that is stored on the tape. Thus, a file-by-file backup can easily provide an incremental backup (wherein only those files that have changed since the last backup are written to tape).

In an image backup, the data image is read sequentially from the disk and written to the tape. As the tape is being written, a detailed file map is created to facilitate a subsequent restore operation. This map is stored on the tape as part of the backup. This detailed map includes each file (or portion thereof) identification, size, and permissions as well as its location(s) on the tape. Creating this detailed map is typically very time consuming. For example, assuming a million files, it could take hours to create its corresponding file map.

Moreover, even though the file map can allow accessing and restoring a particular file after image backup, the tape itself can undesirably decrease file restoration. Specifically, the tape drive has heretofore been fundamentally a sequential backup device, wherein random access or adjusting backward/forward takes significant time. Therefore, in light of the time to create the file map and the time to then access a particular file, many users have historically chosen a file-by-file backup rather than an image backup.

However, technology improvements in tape drives have dramatically increased the speed that files can be accessed, even if tape adjusting is necessary. Therefore, a need arises for backup and restore operations that can take advantage of technology improvements in tape drive speed.

SUMMARY OF THE INVENTION

A method for backing up data in a computer system from a plurality of primary data sources to a secondary data source is provided. The method comprises copying data sections from the plurality of primary data sources to the secondary data source and providing a data pointer on the secondary data source. The data pointer indicates a starting point of each data section from the plurality of primary data sources and where that starting point is on the secondary data source. This data pointer information provides the minimum information necessary to map a location from the primary data source(s) to its location on the secondary data source. Creating this map is much less time consuming than creating the detailed map described above. For example, creating this data pointer information typically takes only a few seconds.

Advantageously, the data sections can be copied from the plurality of primary data sources in the order provided on the plurality of primary data sources, not by file order. In this manner, the method provides a quick and efficient backup of data from the plurality of primary data sources to the second data source.

In one embodiment, each transfer includes at least one data section and information regarding the at least one data section. The information can include, for example, the size of the data section. The data sections can be limited to used bits or a combination of used and unused bits. In the case where the data sections are limited to the used bits, the data pointer information is needed to determine the location on the secondary data source since the amount of data written to the secondary data source varies based on the amount of used bits. In one embodiment, the secondary data source includes a tape drive and the at least one primary data source includes a disk drive.

A method of restoring individual files and/or folders from a secondary data source to a plurality of primary data sources is also provided. The method only requires the minimal data pointer information and directly accesses the data from the secondary data source. The method of restoring individual files and/or folders comprises reading a list of files and/or folders to restore. This list contains the name and identification node number for each file and/or folder to restore. This list is generated during a backup operation and one or more of files and/or folders can be selected for restore. This method of restoring calculates, based on the identification node number, its location on the original primary data source(s) and, after reading the data pointer information from the secondary data source, calculates the location of the identification node of the corresponding section on the secondary data source.

Of importance, the location of the identification node merely indicates a starting point on the secondary data source of a data section associated with the backup transfer. In this manner, the detailed file maps of the prior art can be eliminated, thereby saving significant time during backup of the primary data sources. Once the identification node has been read from the secondary data source, the data section(s) that contain the data for this file and/or folder can be advantageously accessed using the at least one identification node and information in the backup transfer regarding the data section. At this point, the data section(s) can be read from the secondary data source and the file and/or folder data can be restored. In one embodiment, the information in the backup transfer includes a size of the data section as well as sizes of other data sections in the backup transfer.

A tape drive for backing up and restoring data sections for at least one data source is also provided. The tape drive comprises a data pointer, which provides the starting location on the secondary data source for each data section created during a backup from the at least one data source. If the tape drive includes a plurality of transfers of data sections, then each transfer includes information regarding the data sections therein. This information can include sizes of the data sections.

DETAILED DESCRIPTION OF THE DRAWINGS

Figure 1A:
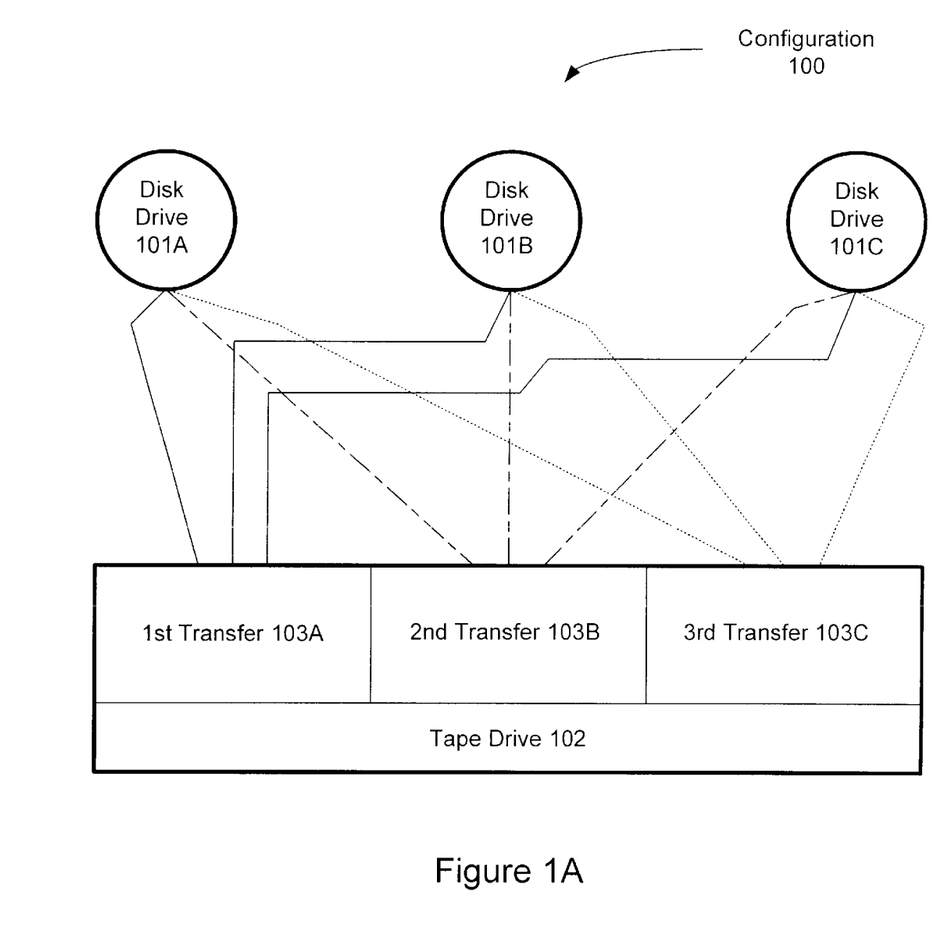
FIG. 1A illustrates a simplified backup configuration.

FIG. 1A illustrates a simplified backup configuration 100. In configuration 100 during backup, a plurality of disk drives 101A, 101B, and 101C provide data to a tape drive 102. In one embodiment, each disk drive 101 can provide its data to tape drive 102 in a round robin sequence. Specifically, during each transfer 103, disk drive 101A provides its backup data first, disk drive 101B provides its backup data second, and disk drive 101C provides its backup data third. Note that although only three disk drives 101 are shown, other embodiments can include any number of disk drives.

In a backup operation, the number of transfers 103 is dependent upon the amount of data that can be transferred and the total amount of data being stored in each disk drive 101. For example, in one embodiment, each transfer can include a maximum of 48 megabytes of data from each disk drive 101. Specifically, during a first transfer 103A, the first 48 megabytes of data from each of disk drives 101A, 101B, and 101C are analyzed. This sequence of data analysis of data blocks can also be used in second transfer 103B as well as in third transfer 103C.

A block of data in a disk drive may include both used as well as unused bits. In accordance with one embodiment, only used bits are actually copied to tape drive 102 during transfers 103. In accordance with one aspect of the invention, limited information regarding those used bits can be stored along with the used bits in tape drive 102 for a subsequent restore operation. This limited information dramatically increases the speed of backup compared to conventional image-based backup systems.

Figure 1B:
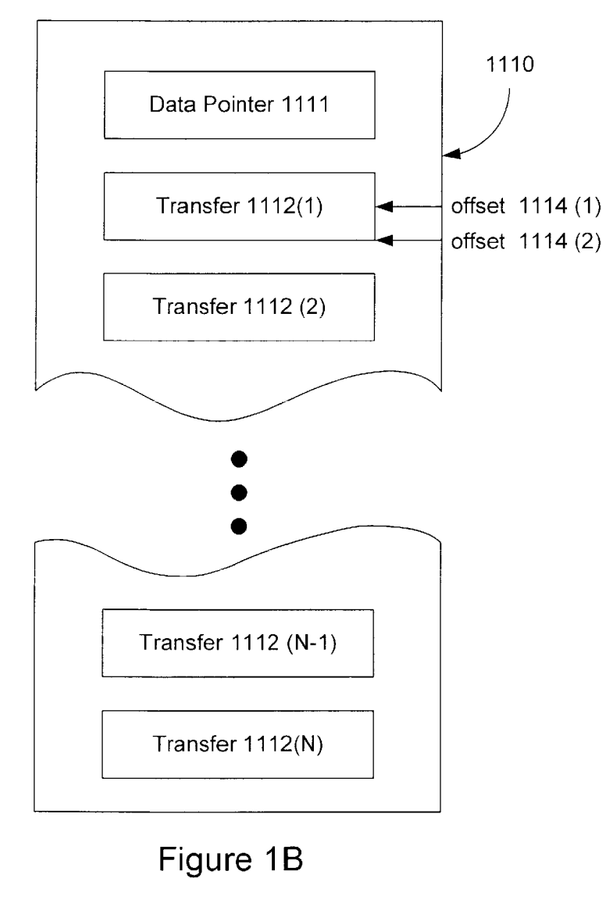
FIG. 1B illustrates a tape with a plurality of data transfers and a data pointer that facilitates accessing data sections of those data transfers.

FIG. 1B illustrates a simplified tape 1110 that includes a data pointer 1111 and a plurality of transfers 1112(1)–1112(N). In this embodiment, assume that each transfer 1112 can include bits of data from a plurality of disk drives. Note that in another embodiment, each transfer 1112 can include bits of data from at least one disk drive.

Figure 1C:
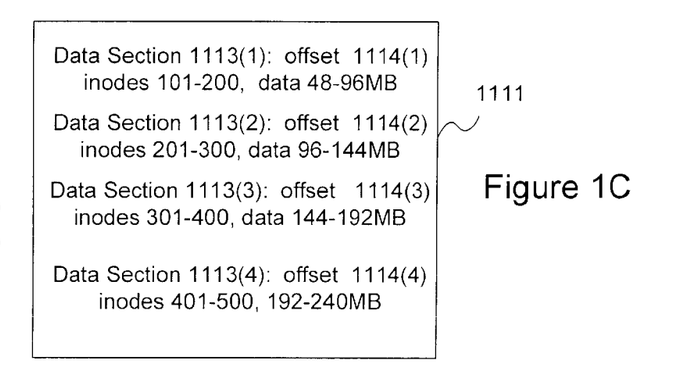
FIG. 1C illustrates an exemplary data pointer that includes a plurality of data sections and their corresponding offset on the tape.

FIG. 1C illustrates one portion of data pointer 1111. In this embodiment, data pointer 1111 includes an offset for each data section that indicates that data section's starting offset on the tape. Each data section references its identification nodes as well as its data blocks (explained below). Each identification node (hereinafter inode) describes a file and indicates which data block(s) contain that file's data. Note that each data section 1113 can have one or more inodes. In this example, each data section 1113 references 100 inodes with a total data block size of 48 megabytes.

For each file being restored, the data section containing the inode is determined using the inode number and then that data section's location on tape is determined using the data pointer information. For example, data section 1113(1) has corresponding inodes 101–200 and data blocks 48 MB–96 MB, data section 1113(2) has corresponding inodes 201–300 and data blocks 96-144MB, data section 1113(3) has corresponding inodes 301–400 and data blocks 144 MB–192 MB, and data section 1113(4) has corresponding inodes 401–500 and data blocks 192 MB–240 MB. Note that the term "data blocks (#1)MB–(#2)MB" refers to the order and original offset of the data blocks from the disk drive(s). Because, in one embodiment, only the used bits are copied during backup, data pointer 1111 advantageously includes the tape offset for each data section 1113. Thus, "data blocks 96–144 MB" refer to the offset of the data blocks copied from one or more disk drives during backup starting at 96 MB and ending at 144 MB.

Of importance, an inode number and data pointer 1111 are used to determine the inode's location on the tape. Information provided by that inode and data pointer 1111 can then be used to locate the file's data block(s) on tape. For example, referring to FIGS. 1B and 1C in tandem, if a user wants to restore a file whose inode number is 114, which is determined to be in data section 1113(1), then the user can refer to data pointer 1111 to find the offset associated with data section 1113(1), i.e. offset 1114(1). This offset 1114(1) indicates the starting location on tape 1110 of data section 1113(1). As noted in FIG. 1B, offset 1114(1) indicates the middle of transfer 1112(1). Therefore, data section 1113(1) was copied to tape 1110 during transfer 1112(1).

Figure 1D:
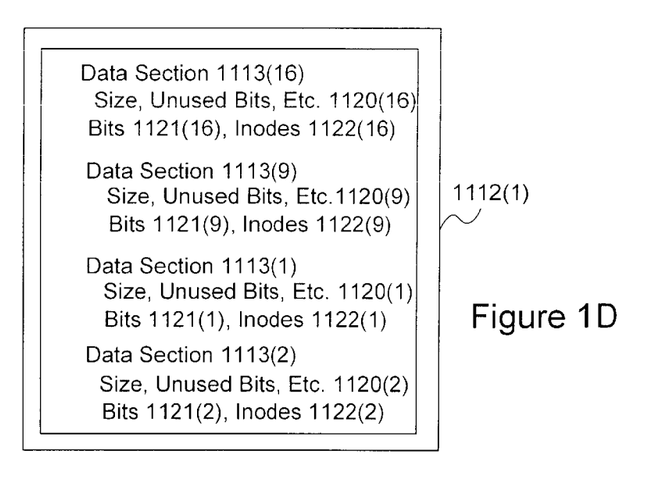
FIG. 1D illustrates an exemplary data transfer in which each data section includes information regarding that data section.

FIG. 1D illustrates a portion of transfer 1112(1) that includes data sections 1113(16), 1113(9), 1113(1), and 1113 (2). In one embodiment, each data section 1113 can include information 1120 (e.g. regarding its size and unused bits), actual data bits 1121, and inodes 1122. For example, data section 1113(16) could indicate (via information 1120(16)) that its bits 1121(16) and inodes 1122(16) have a total size of 12 megabytes, data section 1113(9) could indicate (via information 1120(9)) that its bits 1121(9) and inodes 1122(9) have a total size of 4 megabytes, data section 1113(1) could indicate (via information 1120(1)) that its bits 1121(1) and inodes 1122(1) have a total size of 15 megabytes, and data section 1113(2) could indicate (via information 1120(2)) that its bits 1121(2) and inodes 1122(2) have a size of 18 megabytes.

Figure 1E:
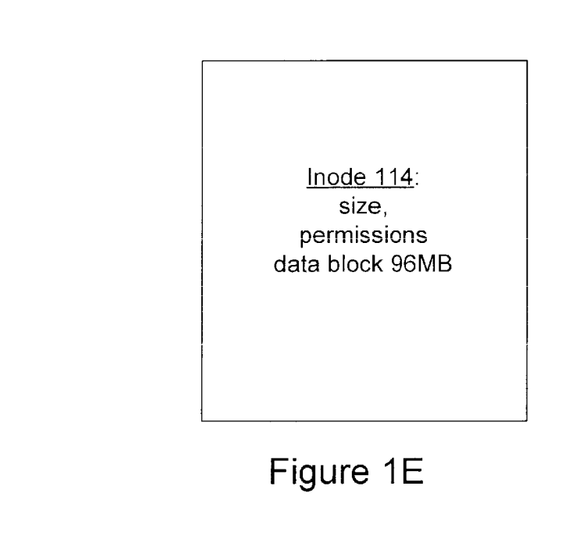
FIG. 1E illustrates an exemplary inode.

In this example, to restore mode 114, the system would read data pointer 1111 to determine that mode 114 is in data section 1113 (1) and find the tape location of data section 1113 (1), i.e. offset 1114 (1). At this point, the system can directly seek the tape to offset 1114 (1), thereby skipping past data sections 1113 (16) and 1113 (9). The system would find mode 114 in modes 1122 (1). FIG. 1E illustrates an exemplary mode 114. In this example, after reading inode 114, the system would find that mode 114 is using data block 96 MB. The system could then, once again using data pointer 1111, determine that data block 96 MB is in data section 1113 (2), find the tape location of data section 1113 (2) (i.e. offset 1114 (2)), directly seek to tape offset 1114 (2), find and read data block 96 MB from data section 1113 (2), and write the data to the file being restored.

In another embodiment, additional information 1120 regarding each data section 1113 can be stored. For example, the number of unused bits of the associated data block and/or their location relative to the used bits can also be stored during data transfer. This additional information can facilitate an identical restore of that data section.

Figure 2A:
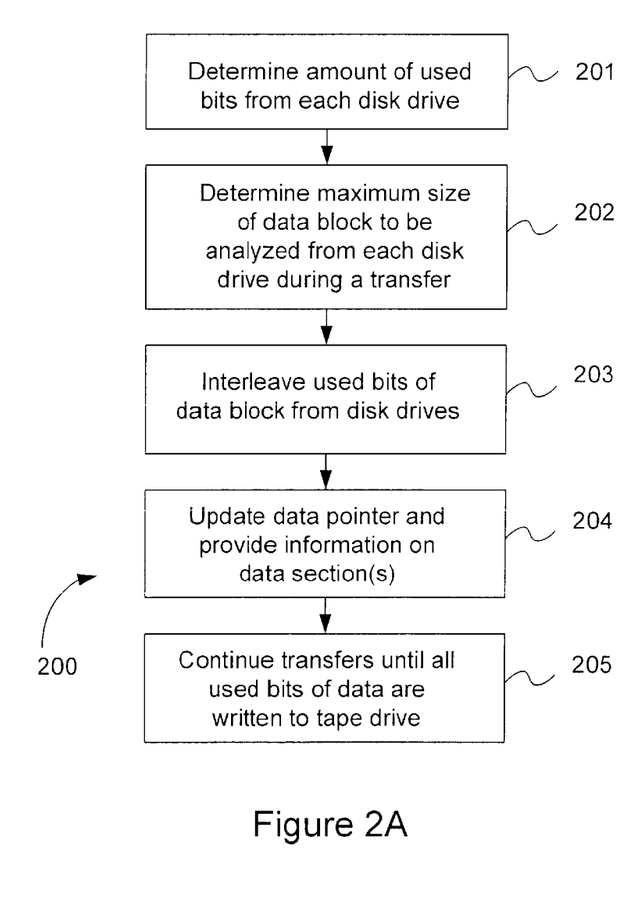
FIG. 2A is a flowchart showing a backup method.

FIG. 2A is a flowchart that shows a method 200 of backing up data. To clarify the steps described therein, Table 1 provides illustrative amounts of used bits (in megabytes) for three data blocks.

TABLE 1

| Disk Drive | 101A | 101B | 101C |
| --- | --- | --- | --- |
| 1st data block | 2 | 10 | 20 |
| 2nd data block | 10 | 20 | 40 |
| 3rd data block | 15 | 45 | 30 |

In step 201, the amount of used bits from each disk drive is determined. In the example provided in Table 1, disk drive 101A has a total of 27 megabytes of used bits, disk drive 101B has a total of 75 megabytes of used bits, and disk drive 101C has a total of 90 megabytes of used bits. This information can be used in determining the maximum size of the data block to be analyzed from each disk drive in step 202. In one embodiment, the file system can determine the data block size based on how it tracks allocation of data on the disk drives. In step 203, the used bits from the designated data blocks can be interleaved on the tape drive. To facilitate a subsequent restore of the data section(s) included in these interleaved used bits, the data pointer can be updated and information regarding the data section(s) can be provided on the tape drive in step 204. Note that the system can also provide additional information regarding the data section(s) in this step. Transfers from the disk drive to the tape drive (i.e. steps 203 and 204) can be continued in step 205 until all bits of data are written to the tape drive.

Using the information in Table 1 for illustrating step 203 and assuming a maximum data block size of 48 megabytes, the system can sequentially read 2 megabytes of used bits from disk drive 101A, 10 megabytes from disk drive 101B, and 20 megabytes from disk drive 101C and write those used bits to the tape drive in a first transfer. Note that in the first transfer of data, significantly more data has been written from disk drives 101B and 101C than disk drive 101A.

Substantially equal data transfers allow multi-tasking both during backup and restore, thereby improving performance of those operations. For example, backup performance can be optimized if data from a plurality of disk drives are transferred to the tape drive in parallel. In a similar manner, restore performance can be optimized if data from the tape drive are transferred to the plurality of disk drives in parallel.

Note that a simplified read/write operation (performed for a transfer during a backup or restore operation) includes a setup step, a format step, and a read/write step. In the setup step, the disk drive is prepared to transmit or receive data. In the format step, the used bits associated with each disk drive and the locations of these used bits on each disk drive are identified. In a read/write step, the data are copied to the tape drive (during the backup operation) or to the disk drives (during the restore operation). Thus, performing read/write operations "in parallel" refers to the overlap of any step being performed by one disk drive with a step being performed by at least one other disk drive. Attempting to attain substantially equal data transfers during backup/restore increases the probability that parallel reading and/or writing occurs, thereby optimizing overall system performance.

Therefore, in one embodiment, the system can compensate for unequal data transfers by reading the used bits of one or more data blocks on a disk drive and writing those bits to the tape drive during each transfer. For example, during the second transfer of data, an amount of used bits from disk drive 101A is read to at least equal the captured used bits of disk drive 101C (i.e. the disk drive having the most captured used bits at that point in time). However, as noted in Table 1, disk drive 101A only has 10 megabytes of used bits in its second data block of 48 megabytes. Therefore, the used bits of third data block of disk drive 101A are analyzed. In its third data block, disk drive 101A has an additional 15 megabytes of used bits.

In one embodiment, all used bits in a block are written in a single transfer. Therefore, during the second transfer, 25 megabytes from disk drive 101A (both $2^{nd}$ and $3^{rd}$ data blocks) are written to the tape drive. At this point, disk drive 101A has the most captured bits (27 megabytes) of any disk drive. Therefore, disk drive 101B, currently having only 10 megabytes of captured used bits, would optimally provide at least the amount of used bits captured for disk drive 101A. In the second data block, disk drive 101B has 20 megabytes of used bits, which when combined with the 10 megabytes captured in the first transfer (30 megabytes) is greater than the total captured bits of disk drive 101A. Therefore, the 20 megabytes of used bits are read from disk drive 101B and written to the tape drive during the second transfer.

At this point, disk drive 101C has less captured bits (20 megabytes) than disk drive 101B (30 megabytes). However, in its second data block, disk drive 101C has 40 megabytes of used bits, which when combined with the 20 megabytes captured in the first transfer (60 megabytes) is greater than the captured bits of disk drive 101B. Therefore, these 40 megabytes of used bits are read from disk drive 101C and written to the tape drive during the second transfer.

During the third transfer, because all used data bits have been captured from disk drive 101A, the data from any remaining disk drives, i.e. disk drives 101B and 101C in this example, can be interleaved. Therefore, if 45 megabytes are read from disk drive 101B and written to the tape drive, then 30 megabytes are read from disk drive 101C and written to the tape drive. Because all used bits from all disk drives have now been written to the tape drive, the backup operation ends in step 204.

Figure 2B:
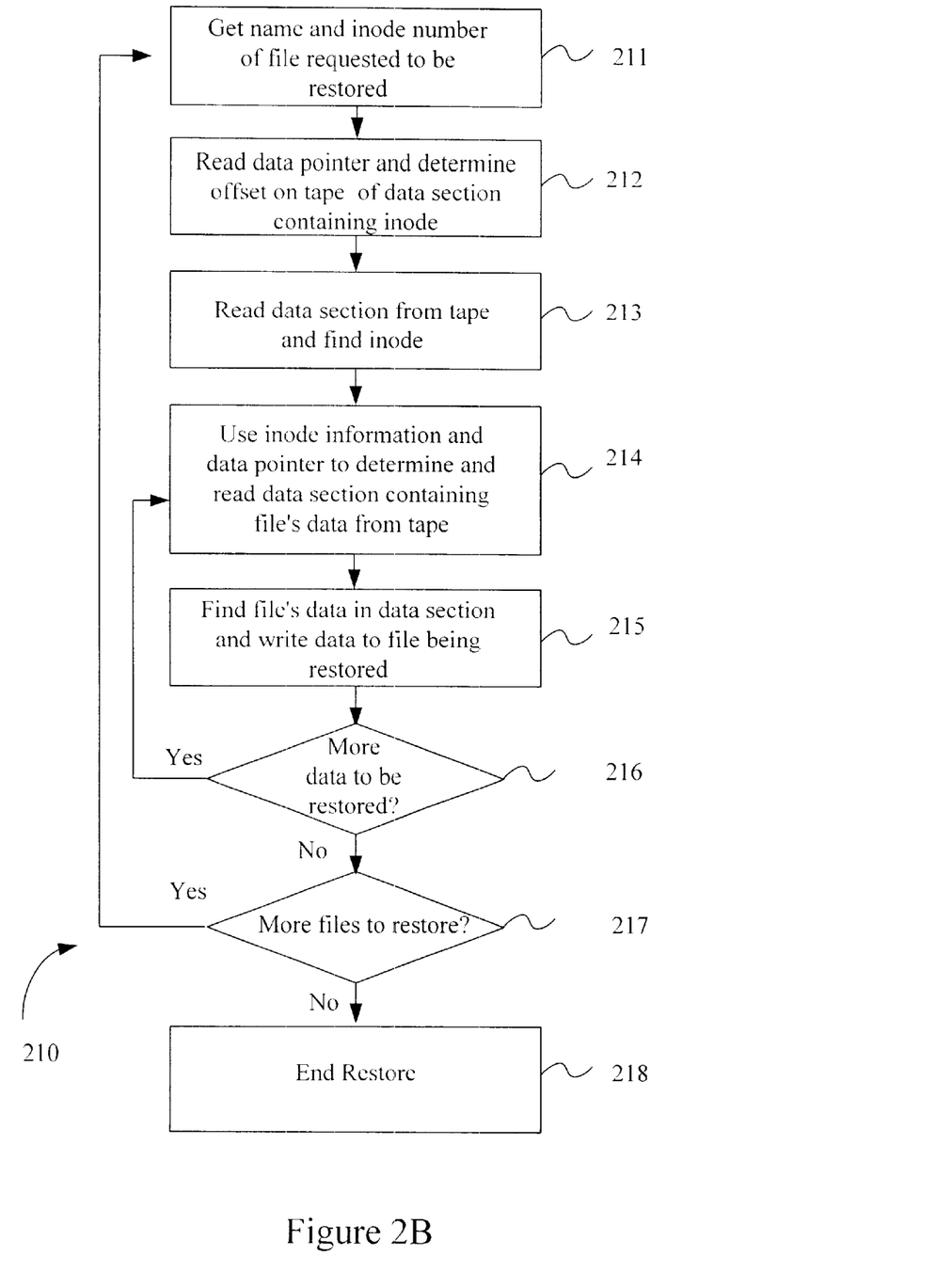
FIG. 2B is a flowchart showing a restore method.

FIG. 2B is a flowchart showing a restore method 210 in accordance with the present invention. In step 211, the system reads the inode number and name of a file and/or folder to be restored. In step 212, based on the inode number and the offset information read from the data pointer, the offset on tape of the inode is calculated. In step 213, the data section containing the inode is read in and the inode is found. In step 214, using the inode information, which describes which data blocks contain the file's data, and again using the data pointer offset information, the data section containing the file's data is read from tape. In step 215, the file's data is found in the data section and written to the file being restore. If the file has additional data, as determined by step 216, then the process returns to step 214. On the other hand, if all the data for this file has been restored, then the process goes to step 217. If any additional files have been requested to be restored, as determined by step 217, then the process returns to step 211. Otherwise, the restore process is ended in step 218.

Figure 3:
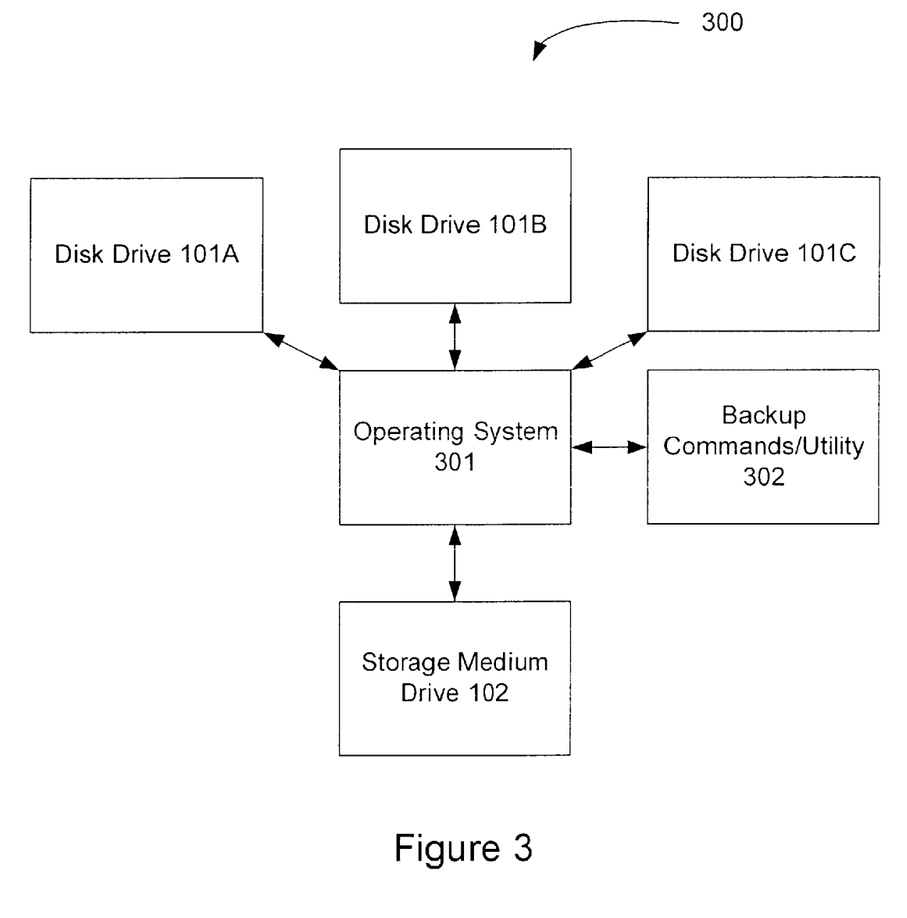
FIG. 3 illustrates a simplified computer system that can implement the present invention.

Referring to FIG. 3, a computer system 300 that can implement the present invention includes an operating system 301 having a software platform on which backup commands/utility 302 can run. Specifically, to direct operating system 301 during the backup or restore operations involving disk drives 101A–101C and tape 102, a user can provide a set of operating system commands or can license a proprietary backup utility from the assignee of the present invention (the functionality of which is described in detail herein). Note that backup commands/utility 302 must be written on top of a particular operating system. Illustrative operating systems include, but are not limited to, DOS, OS/2, Windows NT, and Unix (including Linux). In one embodiment, a system can include a plurality of personal computers each having Intel microprocessors and running a Unix OS. This system can be configured with locally attached tape drives and can include up to 500 gigabytes of disk storage.

As described in reference to FIG. 2A, one embodiment of the method/system reads all used bits of one or more data blocks and writes those bits to a tape drive during a transfer. In another embodiment shown in FIG. 4, a predetermined number of used bits can be read/written in each transfer. For example, in step 401 of method 400, the system determines the amount of used bits from each disk drive. Knowing the amount of used bits in each disk drive, facilitates determining (in step 402) the number of used bits to be written from each disk drive during a transfer. In one embodiment, the used bits for each transfer can be determined by the file system based on how it tracks allocation of data on the disk drives.

Figure 4:
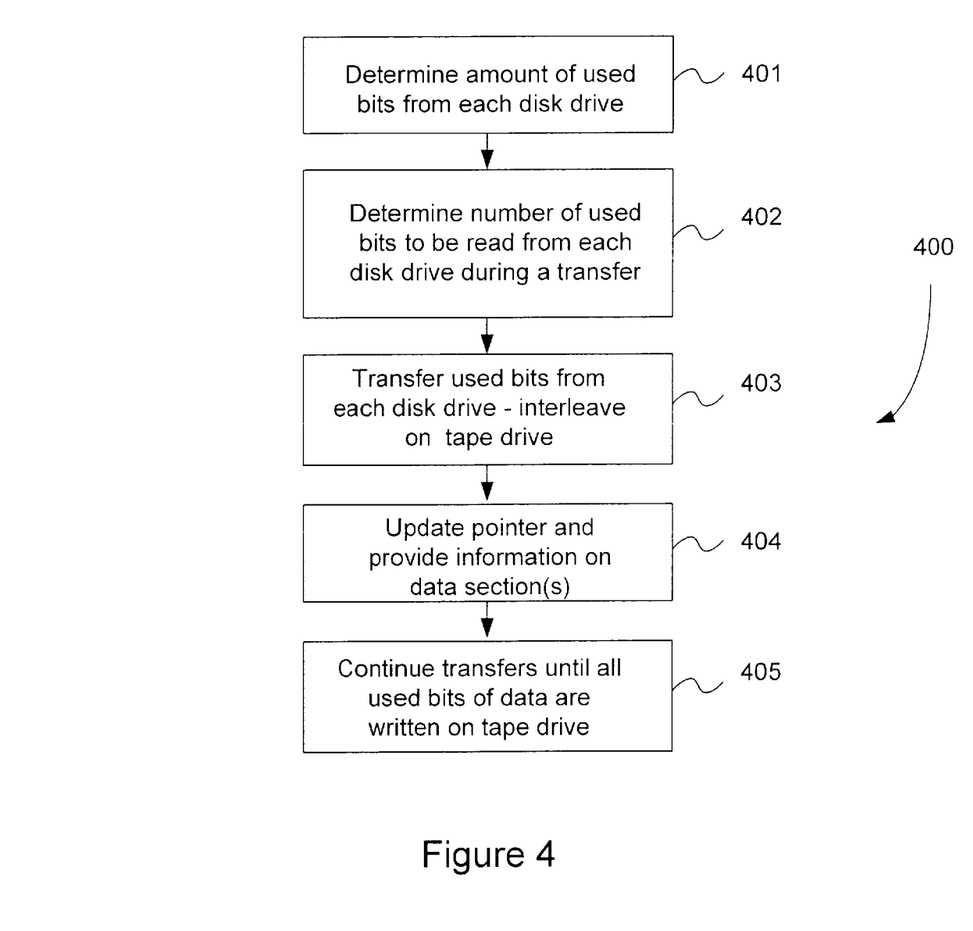
FIG. 4 is a flowchart showing another backup method of the present invention.

For purposes of illustration, assume that disk drives 101A–101C (FIG. 1A) respectively have 27 megabytes, 75 megabytes, and 90 megabytes of used bits. In this embodiment, assume that used bit blocks of 10 megabytes are read from each disk drive and written in an interleaved manner on the tape drive in step 403. In step 404, to facilitate a subsequent restore of the data section(s) included in these interleaved used bits, the data pointer can be updated and information regarding the data section(s) can be provided on the tape drive. Additional information regarding the data section(s) can also be provided (see FIG. 1D) in this step. In this embodiment, nine transfers would have to take place until all used bits of data are written on the tape drive (step 405). Note that during the third transfer disk drive 101A could write only 7 megabytes of used bits. In a similar manner, during the eighth transfer, disk drive 101B could write only 5 megabytes of used bits.

Of importance, using a data pointer significantly reduces the time associated with backing up a plurality of disk drives onto a tape drive. Specifically, instead of creating a detailed file map for each data section, the data pointer merely includes identified data sections and limited tape location information, i.e. the starting points of the data sections. Then, during a restore operation, the actual location of the data section that is to be restored can be derived from information within the transfer. In light of speed improvements in tape devices, an image backup/restore operation using a data pointer is commercially viable and can effectively compete with the file-by-file backup/restore operation currently used in the industry.

In accordance with another embodiment, the amount of used data from each disk drive determines the data bandwidth given to each disk drive during backup and restore. This embodiment is particularly advantageous if multiple disk drives have significantly less used data than other disk drives. In this embodiment, instead of attempting to transfer equal amounts of data from the disk drives, the amount of used data transferred from each disk drive is based on the total amount of used data stored on that disk drive. Specifically, any disk drive having a comparatively large amount of used data is given a larger data bandwidth both during backup and restore than a disk drive having a comparatively small amount of used data. In this manner, the system can ensure the most efficient data transfer for any disk drive having a comparatively large amount of used data.

Figure 5:
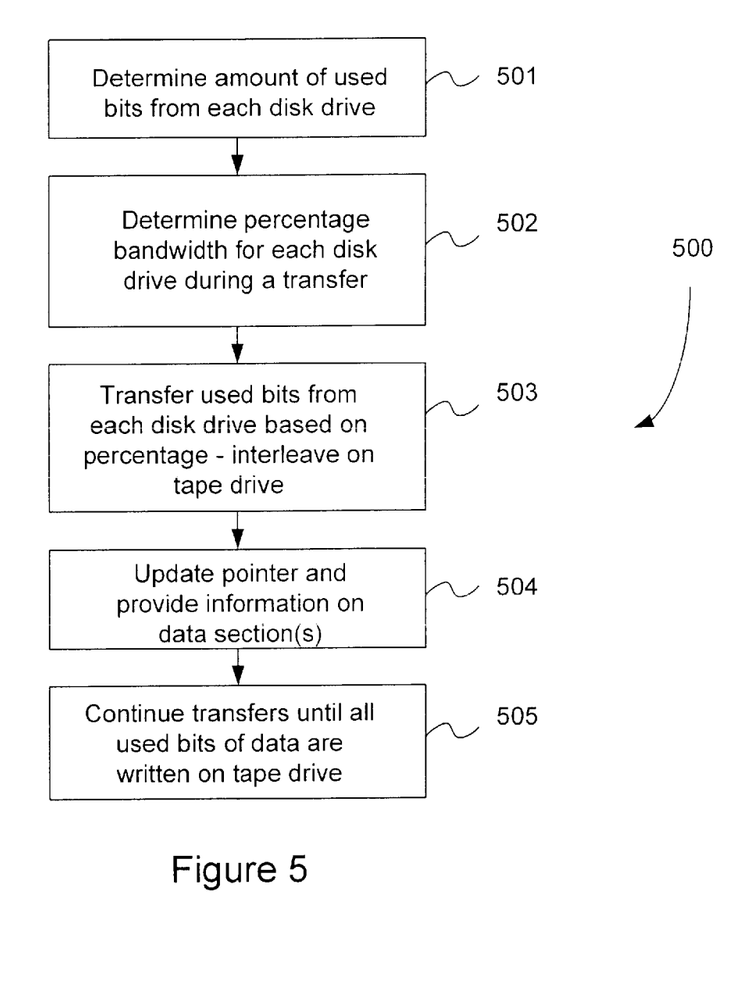
FIG. 5 is a flowchart showing yet another backup method of the present invention.

Referring to FIG. 5, this weighted method 500 begins in step 501 by determining the amount of used bits from each disk drive. Step 501 also includes determining the amount of used data for each transfer. The amount of used data for each transfer can be determined by the file system as described above in reference to FIG. 4. In step 502, a percentage of data bandwidth associated with each disk drive is generated by dividing the amount of used bits from each disk drive by the total number of used bits from all disk drives. In step 503, used bits are transferred from each disk drive based on its data bandwidth. For example, assume that the amount of each data transfer is set to 10 megabytes of used bits. Assume further that disk drives 101A–101C (FIG. 1A) respectively have 15 megabytes of used bits, disk drive 101B has 20 megabytes, and disk drive 101C has 80 megabytes. Thus, the total amount of used bits is 115 megabytes. In accordance with step 502, disk drive 101A should have a 13% data bandwidth (15/115), disk drive 101B should have a 17% data bandwidth (20/115), and disk drive 101C should have a 70% data bandwidth (80/115). Therefore, in step 503, of the 10 megabytes provided in the data transfer, disk drive 101A would contribute 1.3 megabytes, disk drive 101B would contribute 1.7 megabytes, and disk drive 101C would contribute 7 megabytes. To facilitate a subsequent restore of the data section(s) included in these interleaved used bits, the data pointer can be updated and information regarding the data section(s) can be provided on the tape drive in step 504. This weighted interleaving and updating can be continued in step 505 until all used bits of data are written on the tape drive as provided.

As seen from above, in the weighted interleaved embodiment, each disk drive participates in a transfer in direct proportion to its used bits. In this manner, disk drives having comparatively large amounts of information are given more data bandwidth, and thus given more opportunity to run at full speed. Therefore, this embodiment can improve the performance of the disk drives having comparatively large amounts of information.

Note that regardless of embodiment, memory buffers can be included in the present invention to reduce any potential loss of streaming due to variations in the rate of data coming from either the disk drives or the tape drive. In one embodiment of the invention, a memory buffer between 1 and 8 megabytes can be provided during the backup operation, whereas a memory buffer between 128 and 200 megabytes can be provided during the restore operation. In another embodiment, memory buffers for both backup and restore operations are allocated dynamically based on available memory and the number of simultaneous input/output ports.

A system and method for providing direct access recovery of individual files using a seekable tape drive is described in various embodiments herein. Those skilled in the art will recognize modifications to those embodiments. For example, although the data pointer can be located at the beginning of the tape, it can also be located at the end of (or some other location on) the tape. Note that the invention is equally applicable to any data unit. Thus, although restoring of files is discussed in the embodiments herein, other embodiments could use the invention for restoring other data units, e.g. folders. Therefore, the scope of the present invention should only be limited by the appended set of claims.

What is claimed is:

1. A method for performing an image back up of data in a computer system from a plurality of primary data sources to a secondary data source, the method comprising:

copying data sections from the plurality of primary data sources, in an order provided by the plurality of primary data sources, to the secondary data source;

providing a data pointer on the secondary data source regarding a starting point of each data section from the plurality of primary data sources; and specifying, in the data pointer, identification nodes and data blocks associated with each data section, wherein an identification node in a data section indicates a data block location of a file corresponding to that identification node.

2. The method of claim 1, wherein the order provided by the plurality of primary data sources is a disk order for each of the plurality of primary data sources.

3. The method of claim 1, further comprising including information regarding each data section in each transfer on the secondary data source.

4. The method of claim 3, wherein the information regarding each data section includes a size of the data section.

5. The method of claim 1, wherein the data sections are used bits.

6. The method of claim 1, wherein the secondary data source includes a tape drive.

7. The method of claim 1, wherein at least one primary data source includes a disk drive.

8. A method of performing an image restore of a data file from a secondary data source to a primary data source, the method comprising:

reading a data pointer on the secondary data source, wherein the data pointer includes first information regarding associated identification nodes, data blocks, and an offset on the secondary data source for each data section accessing an identification node for the data file using the first information, the identification node being located in a first data section;

using second information in the identification node to identify a first data block associated with the data file;

accessing the first data block using the first and second information; and copying the data file from the secondary data source to the primary data source.

9. The method of claim 8, wherein the first information regarding data blocks includes starting and ending data block information for each data section.

10. The method of claim 8, wherein the second information includes a size of the data block and its data block location on the primary data source.

11. The method of claim 10, wherein the data block is located in one of the first data section and a second data section, as determined by the first and second information.

12. A tape drive that can provide an image back up and restore for at least one file on a data source, the tape drive comprising:

a data pointer including:

a location for each data section created during a backup from the data source, the location indicating a starting point on the tape drive; and a reference to any identification node provided on the tape, wherein each identification node is associated with one data section.

13. The tape drive of claim 12, further including a plurality of transfers of data sections, wherein each data section includes any identification nodes associated with that data section.

14. The tape drive of claim 13, wherein each data section includes its size.

15. The tape drive of claim 13, wherein each identification node includes a file size and a data block identifier.

* * * * *